(12) United States Patent
Ji et al.

(10) Patent No.: US 8,871,012 B2
(45) Date of Patent: Oct. 28, 2014

(54) PACKED COLUMN

(75) Inventors: Jinlin Ji, Nanjing (CN); Lixin Tang, Nanjing (CN)

(73) Assignee: Nanjing College of Chemical Technology, Nanjing (CN)

( * ) Notice: Subject to any disclaimer, the term of this patent is extended or adjusted under 35 U.S.C. 154(b) by 644 days.

(21) Appl. No.: 13/148,426

(22) PCT Filed: Jun. 12, 2009

(86) PCT No.: PCT/CN2009/000649
§ 371 (c)(1),
(2), (4) Date: Aug. 8, 2011

(87) PCT Pub. No.: WO2010/091537
PCT Pub. Date: Aug. 19, 2010

(65) Prior Publication Data
US 2011/0309535 A1    Dec. 22, 2011

(30) Foreign Application Priority Data

Feb. 13, 2009    (CN) .......................... 2009 1 0024792

(51) Int. Cl.
| | | |
|---|---|---|
| *B01D 47/00* | (2006.01) | |
| *B01D 3/14* | (2006.01) | |
| *B01D 3/00* | (2006.01) | |
| *B01D 53/18* | (2006.01) | |
| *B01J 19/32* | (2006.01) | |

(52) U.S. Cl.
CPC ................ *B01J 19/32* (2013.01); *B01D 3/141* (2013.01); *B01J 2219/32275* (2013.01); *B01D 3/008* (2013.01); *B01J 2219/32251* (2013.01); *B01D 53/18* (2013.01); *B01J 2219/32279* (2013.01); *B01J 2219/32206* (2013.01)
USPC .............................................. 96/290; 95/211

(58) Field of Classification Search
None
See application file for complete search history.

(56) References Cited

U.S. PATENT DOCUMENTS

| 6,565,629 B1 * | 5/2003 | Hayashida et al. ............. 95/211 |
| 6,585,237 B2 * | 7/2003 | Pagade ............................. 261/94 |
| 2002/0063344 A1 | 5/2002 | Pagade |
| 2002/0121711 A1 * | 9/2002 | DeGarmo ........................ 261/94 |

FOREIGN PATENT DOCUMENTS

| CN | 1762521 A | 4/2006 |
| CN | 201064713 Y | 5/2008 |

OTHER PUBLICATIONS

Yan, Lai et al., "Progress Situation and Forecast of Modern Packed Column Technology," Chemical Equipment Technology, (Jun. 2007), vol. 28, No. 3, pp. 29-34.

* cited by examiner

*Primary Examiner* — Duane Smith
*Assistant Examiner* — Phillip Shao
(74) *Attorney, Agent, or Firm* — The Webb Law Firm

(57) ABSTRACT

A packed column includes a regular packing (8) and a liquid distribution plate (5). The regular packing (8) is constructed by combining two or more hollow columns, and the hollow columns each have a cross section of circular shape, hexagonal shape or other shapes. The liquid distribution plate (5) has small holes under which liquid guide tubes (4) are connected. The liquid guide tubes (4) lead to all hollow columns of the packing (8). The liquid distribution plate (5) is horizontally installed above the regular packing (8) in a column body (2). Each gas guide plate (11) is made by rotating and twisting a rectangular plate and has several protrusions (12) on its side. The gas guide plates (11) are installed in the hollow columns of the regular packing (8) with the height slightly smaller than that of the hollow columns. A gas outlet (3) is located between the regular packing (8) and the liquid distribution plate (5).

9 Claims, 3 Drawing Sheets

PACKED COLUMN

BACKGROUND OF THE INVENTION

1. Field of Invention

The present invention relates to the field of chemical equipment technologies, in particular, to equipment used in the chemical production, and more particularly, to a packed column for gas-liquid mass transfer such as gas absorption and liquid fine distillation in chemical production.

2. Related Art

The packed column is common equipment in the process of gas-liquid mass transfer. In the column, flow behaviors of gas and liquid phases, and distribution of the liquid have great impact on separation efficiency and production capacity of the packed column. Currently, the packed column used in the chemical production has the following disadvantages. (1) The packing cannot effectively overcome the wall flow effect, and a liquid re-distributor is required every a certain height, so as to avoid dry wall on the surface of the packing; however, the adding the liquid re-distributors reduces the space utilization of the packed column. (2) Even no dry wall is formed on the surface of the packing, the distribution of the liquid flowing downwards on the surface of the packing is not uniform due to the wall flow effect or other reasons, which also has a great impact on the absorption. (3) The packing cannot effectively guide the flow of the gas. Such problems as non-uniform distribution of liquid or even dry wall and insufficient stirring intensity of the uprising gas to a liquid film all affect the contact of the gas and liquid phases, thereby reducing the mass transfer separation efficiency and the production capacity.

SUMMARY OF THE INVENTION

The present invention is directed to optimize the packed column with a new idea from a new aspect on the basis of the research on flow behaviors of gas and liquid phases in the conventional packed column, so as to enhance the contact of the gas and liquid phases, thereby improving the mass transfer separation efficiency and production capacity of the packed column.

In order to realize the above objective, the present invention is implemented through technical solutions as follows.

A new packed column includes a column body, a gas inlet, a gas outlet, a liquid inlet, a liquid outlet, a packing, and a packing support. The liquid outlet is disposed at a lower end of the column body, and the liquid inlet is disposed at an upper end of the column body. The packing is installed in the column body and is supported by the packing support at a lower part thereof. The gas inlet is disposed under the packing support in the column body. The packing is a regular packing, constructed by combining two or more hollow columns, and is installed on the packing support in the column body. Fillers are filled between the hollow columns of the regular packing and between the regular packing and a wall of the column body, so that no gap exists. The gas outlet is disposed above the regular packing. The packed column further includes gas guide plates. Each gas guide plate is made by rotating and twisting a rectangular plate evenly, with every cross section being a straight line. Each of the gas guide plates is installed in a hollow column of the regular packing.

As an improvement of the present invention, in order to ensure that the liquid flows into each hollow column smoothly at the same flow rate, the new packed column further includes a liquid distribution plate and liquid guide tubes. The liquid distribution plate is a circular plate having the diameter slightly smaller than the inner diameter of the column body, and is horizontally installed above the regular packing in the column body. Small holes having the same diameters are opened in the circular plate, and the number of the small holes is the same as the number of the hollow columns of the regular packing. Each small hole has a liquid guide tube connected at a lower part thereof, and the liquid guide tubes lead to the hollow columns of the regular packing and press the gas guide plates. The liquid guide tubes have the same diameter and length.

As an improvement of the present invention, a cross section of the hollow columns of the packed column is in the shape of a circle, a regular hexagon, a regular triangle, or a quadrangle.

As an improvement of the present invention, in order to achieve a better stirring effect of the gas flow speed to a liquid film, the gas guide plate is made of a plastic sheet, with a height slightly smaller than the height of the hollow column.

As an improvement of the present invention, in order to achieve better distribution of the liquid flowing downwards along an inner wall of the hollow column, several protrusions are disposed at a side of the gas guide plate, so that a certain gap is kept between the gas guide plate and the inner wall of the hollow column.

As an improvement of the present invention, in order to ensure that the liquid flows into the hollow columns of the regular packing smoothly, the packed column further includes a liquid level automatic controller installed on the column body above the liquid distribution plate. The liquid level automatic controller includes a liquid level measuring device, an automatic gas inlet valve, and an automatic gas outlet valve, and is used to keep a constant liquid level on the liquid distribution plate by controlling the pressure above the liquid distribution plate.

The present invention has the following advantages. The regular packing is constructed by combining two or more hollow columns, so that two or more small packed columns independent from one another are formed in the packed column, and the gas and liquid in each small packed column are not mixed with those in other small packed column. By using the liquid level automatic controller, the liquid distribution plate and the liquid guide tubes, the liquid is ensured to flow into the small packed columns smoothly at the same flow rate, thereby completely eliminating the impact of non-uniform liquid distribution on the absorption process. Meanwhile, the liquid guide tubes fix the gas guide plates in the hollow columns. No gap exists between the hollow columns and between the regular packing and the column wall, thereby preventing the gas and liquid from flowing between the hollow columns or between the regular packing and the column wall. The gas guide plate guides the gas to flow rotationally in each small packed column at a high speed, thereby increasing the flow speed of the gas, enhancing the stirring effect of the gas on the liquid film, promoting the renewal of the liquid phase surface, and improving the gas-liquid mass transfer rate. Several protrusions provided at the side of the gas guide plate are used to prevent the gas guide plate from closely attaching to the inner side of the hollow column, and do not affect the flow distribution of the liquid flowing downwards along the inner wall of the hollow column. The liquid level automatic controller adjusts the pressure according to the liquid level on the liquid distribution plate, thereby ensuring that the liquid to flows into the hollow columns of the packing smoothly. Therefore, the liquid-gas mass transfer rate can be increased to a great extent, thus improving the production capacity and separation efficiency of the packed column.

The present invention is capable of completely eliminating the non-uniform distribution of liquid in the packed column, greatly increasing the speed of the uprising gas flow, enhancing the stirring effect on the liquid film, promoting the renewal of the liquid phase surface, and improving the gas-liquid mass transfer rate. Therefore, the liquid-gas mass transfer rate can be increased to a great extent, thus improving the production capacity and separation efficiency of the packed column. At the same time, the manufacturing cost of the regular packing can be reduced significantly.

DETAILED DESCRIPTION OF THE INVENTION

Figure 1:
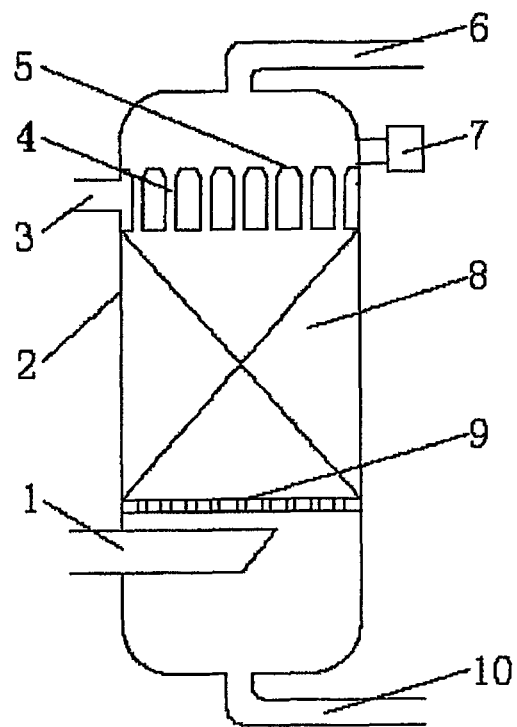
FIG. 1 is a schematic structural view of a packed column according to the present invention.
Figure 2:
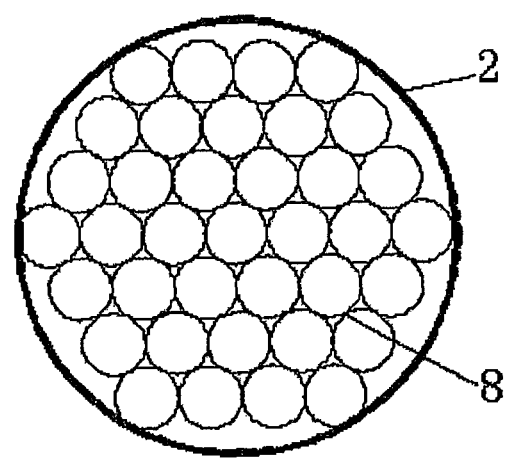
FIG. 2 is a schematic sectional view of a regular packing.
Figure 3:
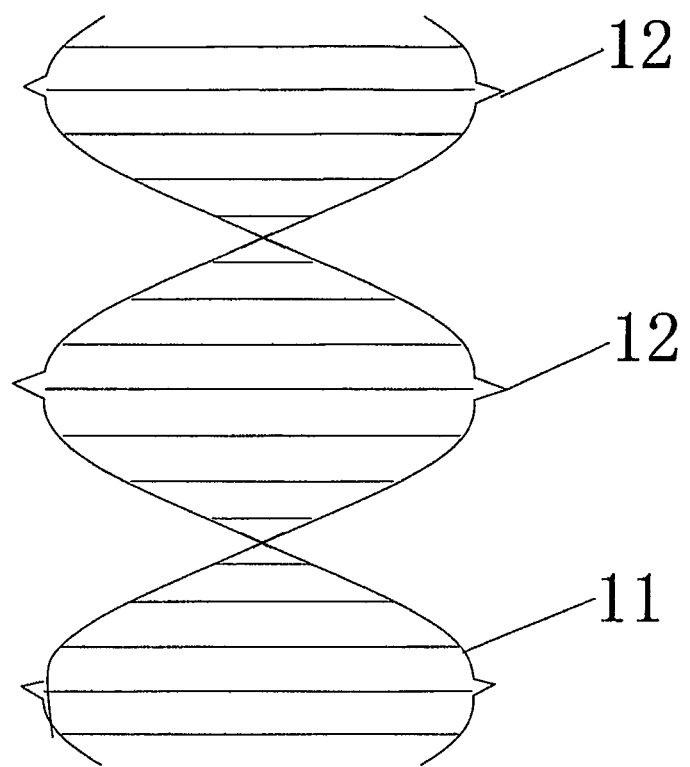
FIG. 3 is a schematic structural plane view of a gas guide plate.
Figure 4:
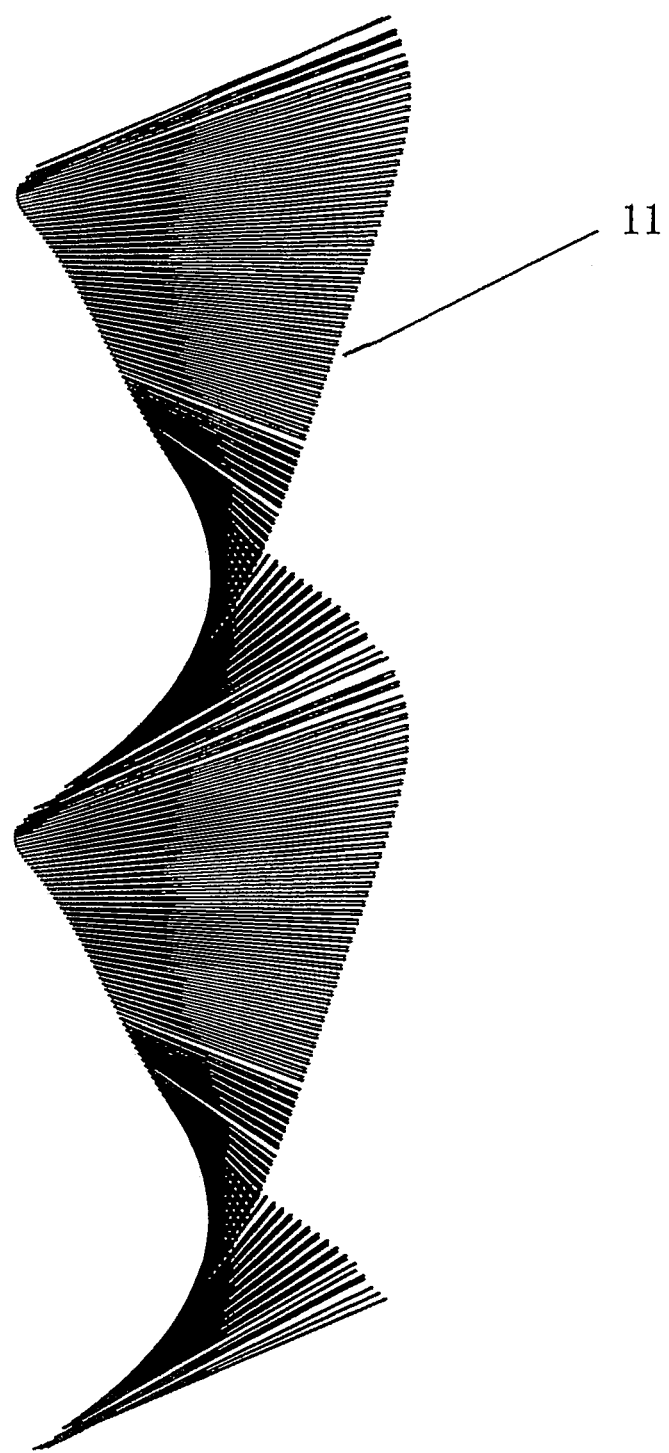
FIG. 4 is a schematic structural three-dimensional view of the gas guide plate.

The present invention is described below in detail with reference to the accompanying drawings.
FIG. 1 is a schematic structural view of a packed column according to the present invention, FIG. 2 is a schematic sectional view of a regular packing, FIG. 3 is a schematic structural plane view of a gas guide plate, and FIG. 4 is a schematic structural three-dimensional view of the gas guide plate.
As shown in the figures, the new packed column according to the present invention includes a column body 2, a gas outlet 3, a gas inlet 1, a liquid outlet 10, a liquid inlet 6, a regular packing 8, liquid guide tubes 4, a liquid distribution plate 5, gas guide plates 11, a liquid level automatic controller 7, and a packing support 9.
The liquid outlet 10 is disposed at a lower end of the column body 2, and the liquid inlet 6 is disposed at an upper end of the column body 2. The regular packing 8 is constructed by combining two or more hollow columns, a cross section of the hollow columns may be in the shape of a circle, a regular hexagon, a regular triangle, a quadrangle, or other shapes. The regular packing 8 is installed on the packing support 9 in the column body 2, and fillers are filled between the hollow columns of the regular packing 8 and between the regular packing 8 and an inner wall of the column body 2, so that no gap exists. In order to increase the flow speed of the gas in the hollow column, enhance the stirring effect of the gas on the liquid film, and improve the mass transfer rate, a gas guide plate 11 is installed in each hollow column. The gas guide plate 11 is helical and is made by rotating and twisting a rectangular plate evenly to form a helix, with every cross section being a straight line, and has a height slightly smaller than that of the hollow column. A lower part or the gas guide plate 11 is supported on the packing support 9 or other supports, and an upper part of the gas guide plate 11 is pressed by the liquid guide tube 4 for being positioned. Under the guide of the gas guide plate 11, the gas flows rotationally in the hollow column at a high speed, thereby increasing the flow speed of the gas, enhancing the stirring effect on the liquid film, and improving the renewal of the liquid phase surface.
In order to ensure that the liquid to flows into each small packed column smoothly at the same flow rate, and completely eliminate the impact of non-uniform liquid distribution on the absorption process, the new packed column is further provided with the liquid distribution plate 5 and the liquid guide tubes 4. The liquid distribution plate 5 is a circular plate having a diameter slightly smaller than the inner diameter of the column body 2, and is horizontally installed above the regular packing 8 in the column body 2. Small holes each having the same diameter are opened in the circular plate 5, and the number of the small holes is the same as the number of the hollow columns in the regular packing 8. Each small hole has a liquid guide tube 4 connected at a lower part thereof, and the liquid guide tubes 4 lead to the hollow columns of the regular packing 8. The liquid guide tubes 4 each have the same diameter and length, and at the same time, have the function of fixing the gas guide plates in the hollow columns. The gas inlet 1 is disposed under the packing support 9 in the column body 2, and the gas outlet 3 is disposed between the regular packing 8 and the liquid distribution plate 5.

In order to prevent that the gas guide plate 11 closely attached to the inner side of the hollow column of the regular packing 8 affects the flow distribution of the liquid flowing downwards along the inner wall of the hollow column, several protrusions 12 are disposed on the side of the gas guide plate 11, such that a gap is always kept between the gas guide plate 11 and the inner wall of the hollow column. The gas guide plate 11 may be made of a plastic sheet or other materials, and during the manufacturing, the gas guide plate may be rotated and twisted by more than two circles as required.

The present invention further includes the liquid level automatic controller 7. The liquid level automatic controller 7 is installed on the column body 2 above the liquid distribution plate 5, and includes a liquid level measuring device, an automatic gas inlet valve, and an automatic gas outlet valve. The liquid level automatic controller 7 adjusts pressure according to the liquid level on the liquid distribution plate 5, so as to ensure that the liquid flows into the hollow columns of the regular packing 8 smoothly.

The liquid enters from the liquid inlet 6 to be located on the liquid distribution plate 5 in the column body 2, and enters into the hollow columns of the regular packing 8 smoothly and at a completely uniform flow rate under the guide and control of the liquid distribution plate 5, the liquid guide tubes 4, and the liquid level automatic controller 7. The liquid flows downwards along the inner walls of the hollow columns, gathers at the bottom of the column, and flows out of the column body 2 from the liquid outlet 10. The gas passes through the gas inlet 1 and enters the column body 2, flows upwards rotationally at a high speed in the hollow columns of the regular packing 8 under the guide of the gas guide plates 11, thereby achieving thermal transfer and mass transfer between the gas phase and the liquid phase. The gas exits the column body 2 from the gas outlet 3 between the regular packing 8 and the liquid distribution plate 5. The packing support 9 supports the regular packing 8 and the gas guide plates 11 at the same time.

The present invention has the following technical characteristics.

The regular packing 8 includes two or more small packed columns having the cross section in the shape of a circle, a regular hexagon, a regular triangle, a quadrangle, or other shapes. The liquid distribution plate 5 guides the liquid directly into the small packed columns in a completely uniform manner through the liquid guide tubes 4, and at the same time, the liquid guide tubes 4 function to fix the gas guide plates 11 in the hollow columns. The liquid level automatic controller 7 controls the liquid level above the liquid distribution plate 5 to be constant. The gas guide plate 11 is added in each hollow column of the regular packing 8.

The packed column is characterized in the follow features.

1. The packed column of this structure is constructed by two or more independent small packed columns, the gas and liquid in each small packed column are not mixed with those in other small packed column, and the liquid flows at the same flow rate, thereby completely eliminating the impact of the non-uniform liquid distribution on the absorption process.

2. The gas guide plates added in the hollow columns of the regular packing greatly increases the speed of the uprising gas flow, enhances the stirring effect on the liquid film, and promotes the renewal of the liquid phase surface. Therefore, the gas-liquid mass transfer rate can be increased to a great extent, thereby improving the production capacity and separation efficiency of the packed column.

3. The liquid level automatic controller adjusts the pressure above the liquid distribution plate to keep the constant liquid level on the liquid distribution plate, thus ensuring that the liquid to flows into the hollow columns of the regular packing smoothly.

4. In the packed column of this structure, no liquid redistributor is required in spite of the height of the packing layer, and therefore, the space utilization of the packed column is improved.

Embodiment 1

In a packed absorption column installed with a stainless steel gauze packing, pure water is used to absorb ammonia in a gas mixture of air and ammonia, an operational liquid-gas ratio is 1.8 (in mole), 2.5% (volume %) ammonia is contained in the gas mixture at the inlet, and a detected absorption rate is 92.6%. After the packed column according to the present invention is used, that is, a regular packing including circular hollow columns having a radius of 1.0 cm is installed in the packed column, each circular hollow column is added with a gas guide plate made by rotating and twisting a plastic sheet, and a liquid distribution plate and liquid guide tubes are installed above the regular packing, with other conditions unchanged, the detected absorption rate increases to 95.8%. Further, in the above two conditions, the maximum processing capacity of the latter test equipment increases by 13% as compared with that of the former one.

Embodiment 2

In a packed absorption column installed with a stainless steel Dixon packing, pure water is used to absorb acetone in a gas mixture of air and acetone, an operation temperature is 293K, an operation pressure is 101.3 kPa and when 3% (volume %) acetone is contained in the gas mixture at the inlet, a detected absorption rate is 91%. After the packed column according to the present invention is used, that is, a regular packing including circular hollow columns having a radius of 1.0 cm is installed in the packed column, each circular hollow column is added with a gas guide plate made by rotating and twisting a plastic sheet, and a liquid distribution plate and liquid guide tubes are installed above the regular packing, with other conditions unchanged, the detected absorption rate of the test equipment increases to 94.9%. Further, in the above two conditions, the maximum processing capacity of the latter test equipment increases by 11% as compared with that of the former one.

The above embodiments are not intended to limit the present invention, and technical solutions obtained by equivalent replacement or equivalent transformation are included in the protection scope of the present invention.

What is claimed is:

1. A packed column, comprising a column body, a gas inlet, a gas outlet, a liquid inlet, a liquid outlet, a packing, and a packing support, wherein the liquid outlet is disposed at a lower end of the column body, the liquid inlet is disposed at an upper end of the column body, the packing is installed in the column body and supported by the packing support at a lower part thereof, and the gas inlet is disposed under the packing support in the column body, wherein the packing is a regular packing, constructed by combining two or more hollow columns, and is installed on the packing support in the column body, fillers are filled between the hollow columns of the regular packing and between the regular packing and a wall of the column body, so that no gap exists, the gas outlet is disposed above the regular packing, the packed column further comprises gas guide plates, each gas guide plate is in the form of a helix, and each of the gas guide plates is installed within one of the hollow columns of the regular packing.

2. The packed column according to claim 1, wherein further comprising a liquid distribution plate and liquid guide tubes, wherein the liquid distribution plate is a circular plate having a diameter slightly smaller than an inner diameter of the column body, and is horizontally installed above the regular packing in the column body, small holes each having the same diameter are opened in the circular plate, and the number of the small holes is the same as the number of the hollow columns in the regular packing, each small hole has a liquid guide tube connected at a lower part thereof, the liquid guide tubes lead to the hollow columns of the regular packing and press the gas guide plate, and the liquid guide tubes each have the same diameter and length.

3. The packed column according to claim 1 or 2, wherein a cross section of the hollow columns of the packed column is in the shape of a circle, a regular hexagon, a regular triangle, or a quadrangle.

4. The packed column according to claim 1 or 2, wherein the gas guide plate is made of a plastic sheet, and has a height slightly smaller than the height of the hollow column.

5. The packed column according to claim 1 or 2, wherein several protrusions are disposed at a side of the gas guide plate.

6. The packed column according to claim 2, further comprising a liquid level automatic controller, wherein the liquid level automatic controller is installed on the column body above the liquid distribution plate, and the liquid level automatic controller comprises a liquid level measuring device, an automatic gas inlet valve, and an automatic gas outlet valve.

7. The packed column according to claim 3, wherein the gas guide plate is made of a plastic sheet, and has a height slightly smaller than the height of the hollow column.

8. The packed column according to claim 7, wherein several protrusions are disposed at a side of the gas guide plate.

9. The packed column according to claim 8, further comprising a liquid level automatic controller, wherein the liquid level automatic controller is installed on the column body above the liquid distribution plate, and the liquid level automatic controller comprises a liquid level measuring device, an automatic gas inlet valve, and an automatic gas outlet valve.

* * * * *